United States Patent
Kobayashi et al.

(10) Patent No.: US 8,857,388 B2
(45) Date of Patent: Oct. 14, 2014

(54) VALVE OPEN/CLOSE TIMING CONTROL SYSTEM

(71) Applicant: Aisin Seiki Kabushiki Kaisha, Kariya (JP)

(72) Inventors: Masaki Kobayashi, Okazaki (JP); Kazunari Adachi, Chiryu (JP); Kazuo Ueda, Gamagori (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/946,319

(22) Filed: Jul. 19, 2013

(65) Prior Publication Data

US 2014/0060470 A1 Mar. 6, 2014

(30) Foreign Application Priority Data

Sep. 6, 2012 (JP) .................................. 2012-196472

(51) Int. Cl.
*F01L 1/34* (2006.01)
*F01L 1/344* (2006.01)

(52) U.S. Cl.
CPC ............... *F01L 1/344* (2013.01); *F01L 1/3442* (2013.01); *F01L 2001/34459* (2013.01)
USPC ..................... 123/90.15; 123/90.17; 464/160

(58) Field of Classification Search
USPC .................. 123/90.11, 90.15, 90.17; 464/160
See application file for complete search history.

(56) References Cited

U.S. PATENT DOCUMENTS 8,578,900 B2 * 11/2013 Kikuoka et al. ............ 123/90.17
2012/0152190 A1 6/2012 Kobayashi et al.

FOREIGN PATENT DOCUMENTS

JP 3832730 B2 10/2006
WO WO 2011/055589 A1 5/2011

\* cited by examiner

*Primary Examiner* — Ching Chang
(74) *Attorney, Agent, or Firm* — Buchanan Ingersoll & Rooney PC (57) ABSTRACT

Provided is a valve open/close timing control system where a valve open/close timing control device includes a drive-side rotating member, a driven-side rotating member, a relative rotational phase control mechanism, and a first locking member, in which the internal combustion engine is configured to be started by a drive force generated by a traveling motor or by a drive force generated by a starter motor, and the valve open/close timing control system also includes a control unit which is configured, for starting the internal combustion engine while changing the relative rotational phase at the time of starting the internal combustion engine, to drive the starter motor or the traveling motor at the time of starting the internal combustion engine at the first locking phase, and to drive the traveling motor at the time of starting the internal combustion engine at the second locking phase.

6 Claims, 7 Drawing Sheets

VALVE OPEN/CLOSE TIMING CONTROL SYSTEM

CROSS REFERENCE TO RELATED APPLICATIONS

This application is based on and claims priority under 35 U.S.C. §119 to Japanese Patent Application 2012-196472, filed on Sep. 6, 2012, the entire content of which is incorporated herein by reference.

TECHNICAL FIELD

This disclosure relates to a valve open/close timing control system, and more particularly to a control of a locking mechanism which, in a valve open/close timing control device which is constituted of a drive-side rotating member which is synchronously rotatable with a crankshaft and a driven-side rotating member which is integrally rotatable with a camshaft, restrains a relative rotational phase between the drive-side rotating member and the driven-side rotating member at the time of starting an internal combustion engine.

BACKGROUND DISCUSSION

Japanese patent 3832730 (Reference 1) discloses, as a technique relevant to the above-mentioned valve open/close timing control system, the constitution is disclosed where a driven-side rotating member (first rotating member (rotor) in Reference 1) is fitted into the inside of a drive-side rotating member (second rotating member in Reference 1). Reference 1 also discloses the constitution where a locking body is provided in an extendable and retractable manner from an inner periphery of the drive-side rotating member to a locking oil passage formed on an outer periphery of the driven-side rotating member, and a spring which biases the locking body in the projecting direction is provided.

Reference 1 discloses the constitution where locking of the locking body is released by a centrifugal force along with the rotation of a valve open/close timing control device, and also discloses a control mode where locking is released by supplying working oil to the locking oil passage before a rotational speed reaches a speed at which the locking body is released by a centrifugal force at the time of starting an internal combustion engine (engine in Reference 1).

International Publication WO2011/055589 (Reference 2) discloses the constitution where a plurality of fluid pressure chambers are formed on an inner peripheral side of a drive-side rotating member, a driven-side rotating member is fitted into the inside of the drive-side rotating member, and each fluid pressure chamber is partitioned by a vane mounted on an outer surface of the driven-side rotating member in a projecting manner thus forming an advanced angle chamber and a retarded angle chamber in each fluid pressure chamber. The constitution disclosed in Reference 2 also includes an intermediate locking mechanism which restrains a relative rotational phase between the drive-side rotating member and the driven-side rotating member to an intermediate locking phase which is positioned between a most advanced angle and a most retarded angle, and a most retarded angle locking mechanism which restrains the relative rotational phase at a most retarded angle phase at which the relative rotational phase becomes a most retarded angle.

Reference 2 discloses the constitution where the intermediate locking mechanism includes a groove-shaped intermediate locking groove formed on an outer periphery of a driven-side rotating member, and a pair of intermediate locking members which is mounted on a drive-side rotating member in an extendable and retractable manner, and a relative rotational phase is restrained to an intermediate locking phase by making both intermediate locking members simultaneously engage with the intermediate locking groove at both end positions. Reference 2 also discloses the constitution where the most retarded angle locking mechanism includes, besides the intermediate locking mechanism, a most retarded angle locking groove formed on an outer periphery of the driven-side rotating member and a most retarded angle locking member which is supported on the drive-side rotating member in an extendable and retractable manner, in which the relative rotational phase is restrained to a most retarded angle phase by making the most retarded angle locking member engage with the most retarded angle locking groove.

To consider a control mode of a hybrid-type vehicle, an engine is stopped in the case where a battery is sufficiently charged, and an engine is started in the case where a discharge amount of the battery exceeds a predetermined value and in the case where a traveling torque is insufficient and an assist is necessary. Accordingly, start and stop of the engine are frequently performed due to such a control.

Further, in starting an engine in a hybrid-type vehicle, for the purpose of suppressing vibrations of the engine at the time of starting the engine, an attempt has been made to reduce (suppress) a compression ratio of the engine using a valve open/close timing control device. However, startability is lowered when a compression ratio is reduced and hence, under a present situation, the ignition of a gas mixture in an engine is performed after a rotational speed (the number of rotations per a unit time) of the engine is elevated to a high value (approximately 800 to 1200 rpm).

On the other hand, when an engine is started at a compression ratio suitable for starting in a general-type engine, the engine is started with a rotational speed of a crankshaft set at a relatively low value (approximately 100 to 300 rpm). In this case, power consumed by a starter motor for rotating a crankshaft is not so large. To the contrary, however, in a control where the engine is started in a state where a compression ratio is reduced as described above, it is necessary to elevate a rotational speed of the engine to a high value as described above and hence, electric power of a battery is wastefully consumed thus shortening a traveling distance. Accordingly, there is a room for improvement with respect to such a control.

A need thus exists for a valve open/close timing control system which can reasonably prevent the wasteful power consumption at the time of starting an internal combustion engine.

SUMMARY

In order to solve the above-described problem, according to an aspect of this disclosure, there is provided a valve open/close timing control system where a valve open/close timing control device includes:

a drive-side rotating member which is rotated synchronously with a crankshaft of an internal combustion engine;

a driven-side rotating member which is arranged coaxially with a camshaft for opening or closing a valve and is integrally rotated with the camshaft;

a relative rotational phase control mechanism which displaces a relative rotational phase between the drive-side rotating member and the driven-side rotating member in an advanced angle direction or in a retarded angle direction by selectively supplying working oil to one of an advanced angle chamber and a retarded angle chamber formed between the drive-side rotating member and the driven-side rotating member; and a first locking member which is biased to a locking position by a first biasing mechanism for restraining the relative rotational phase at a predetermine first locking phase, and a second locking member which is biased to a locking position by a second biasing mechanism for restraining the relative rotational phase at a second locking phase which is displaced in the retarded angle direction from the first locking phase, in which the internal combustion engine is configured to be started by a drive force generated by a traveling motor used for traveling or by a drive force generated by a starter motor used at the time of starting the internal combustion engine, and the valve open/close timing control system also includes a control unit which is configured, for starting the internal combustion engine while changing the relative rotational phase at the time of starting the internal combustion engine, to drive the starter motor or the traveling motor at the time of starting the internal combustion engine at the first locking phase, and to drive the traveling motor at the time of starting the internal combustion engine at the second locking phase.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here is explained with reference to the attached drawings.

[Basic Constitution]

Figure 1:
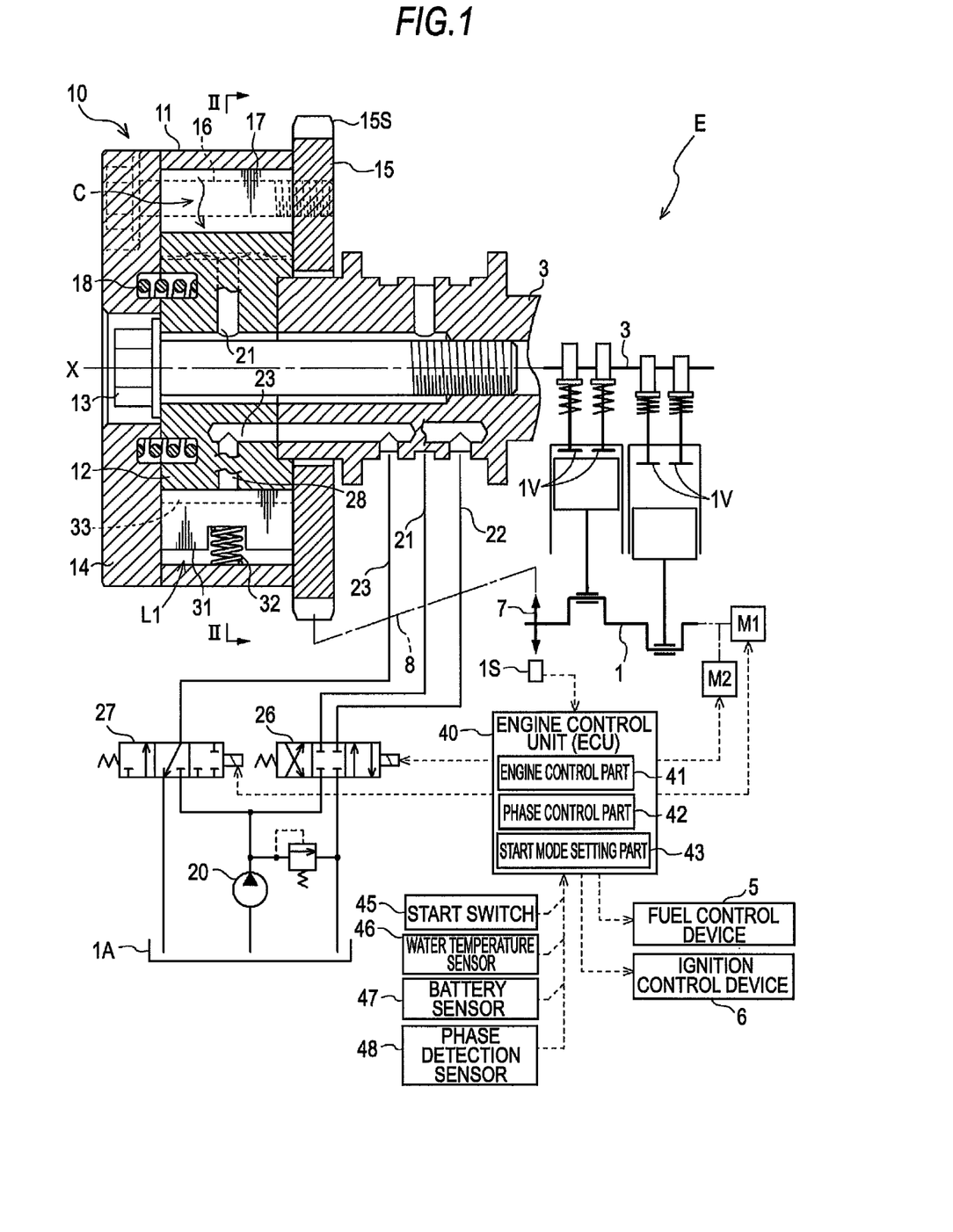
FIG. 1 is a view showing a cross section of a valve open/close timing control device and the constitution of an internal combustion engine control mechanism.
Figure 2:
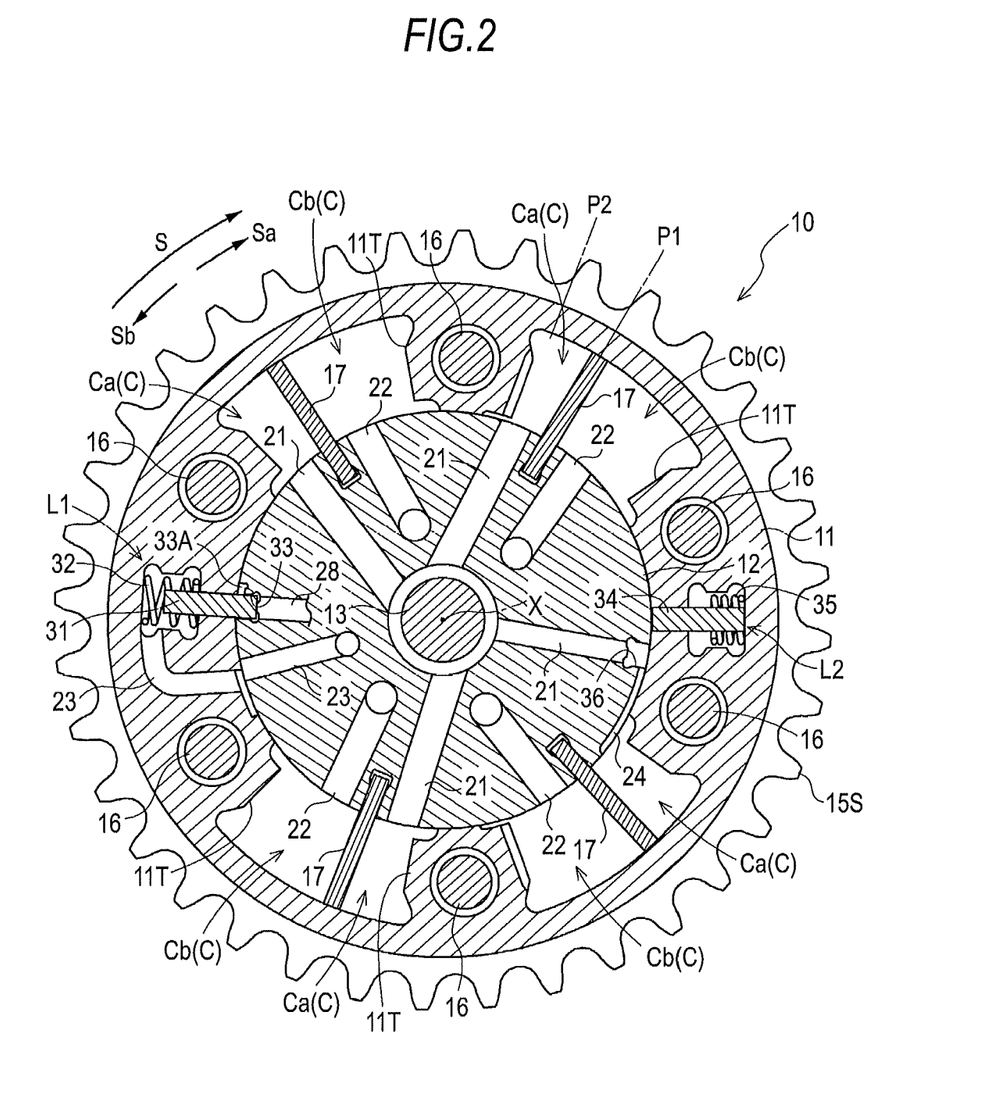
FIG. 2 is a cross-sectional view taken along a line II-II in FIG. 1 and also a cross-sectional view of the valve open/close timing control device at an intermediate locking phase.

As shown in FIG. 1 and FIG. 2, an embodiment disclosed here will be an internal combustion engine control system which is constituted of a valve open/close timing control device 10 for setting open/close timing of an intake valve 1V of an engine E which constitutes an internal combustion engine, the engine E, a traveling motor M1, a starter motor M2, and an engine control unit (ECU) 40 which controls these parts.

The internal combustion engine control system is mounted on a vehicle having a hybrid system which performs traveling using a drive force of the traveling motor M1, and assists the traveling by a drive force of the engine E when a traveling torque of the traveling motor M1 becomes insufficient. The internal combustion engine control system of the present invention may be applicable to a vehicle capable of performing an idling stop control where the engine E is automatically stopped when the vehicle stops and waits for a signal to change or the like, and the engine E is started immediately before traveling.

In the vehicle, the above-mentioned traveling motor M1 is interposed in a transmission system which transmits a drive force from a crankshaft 1 of the engine E, and the traveling motor M1 functions as a generator which generates electric power. The engine E is also provided with the starter motor M2 dedicated to starting of the engine E.

The engine control unit 40 controls valve open/close timing set by the valve open/close timing control device 10, controls the start and the stop of the engine E, and controls the traveling motor M1 and the starter motor M2.

The engine E includes a fuel control device 5 which controls injection of fuel into an intake port or a combustion chamber, and an ignition control device 6 for controlling ignition of air/fuel mixture by an ignition plug (not shown in the drawing). The engine E includes a shaft sensor 1S which detects a rotational angle and a rotational speed (rotational speed per unit time) of the crankshaft 1, and a water temperature sensor 46 which detects a water temperature of cooling water. Although the specific constitution is not described, the valve open/close timing control device 10 includes a phase detection sensor 48 which detects a relative rotational phase between an outer rotor 11 (one example of a drive-side rotating member) and an inner rotor 12 (one example of a driven-side rotating member).

The vehicle includes a battery (not shown in the drawing) which supplies electric power to the traveling motor M1 and the starter motor M2, and a battery sensor 47 which acquires a discharge amount of the battery based on a voltage of the battery. The vehicle also includes a start switch 45 which starts or stops the hybrid system. A detection result of the shaft sensor 1S, a signal from the start switch 45, a detection result of the water temperature sensor 46, a detection result of the battery sensor 47, and a detection result of the phase detection sensor 48 are inputted to the engine control unit 40.

The engine control unit 40 includes an engine control part 41, a phase control part 42 and a start mode setting part 43. The engine control part 41 controls the start and the stop of the engine E. The phase control part 42 efficiently operates the engine E by controlling the relative rotational phase between the outer rotor 11 and the inner rotor 12 in a state where the engine E is operated, and also controls two kinds of locking mechanisms described later. The start mode setting part 43 performs a control of two kinds of locking mechanisms described later at the time of starting the engine E by the engine control part 41. The control constitution and the control mode relating to the engine control unit 40 are described later.

[Valve Open/Close Timing Control Device]

As shown in FIG. 1 and FIG. 2, the valve open/close timing control device 10 includes the outer rotor 11 which is synchronously rotatable with the crankshaft 1 of the engine E, and the inner rotor 12 which is connected to a camshaft 3 which opens or closes the intake valve 1V of a combustion chamber of the engine E by a connecting bolt 13. The inner rotor 12 is fitted in the inside of the outer rotor 11 such that an axis of the outer rotor 11 and an axis of the inner rotor 12 become coaxial with each other, and the outer rotor 11 and the inner rotor 12 are rotatable relative to each other about an axis of rotation X. In this constitution, the axis of rotation X is an axis of rotation of the camshaft 3 and also an axis of rotation of the outer rotor 11 and the inner rotor 12.

The outer rotor 11 and the inner rotor 12 are fastened by a plurality of fastening bolts 16 at a position sandwiched by a front plate 14 and a rear plate 15. A timing sprocket 15S is formed on an outer periphery of the rear plate 15. The inner rotor 12 is arranged in a state where the center portion of the inner rotor 12 penetrates an opening formed in a center portion of the rear plate 15, and the intake-side camshaft 3 is connected to an end portion of the inner rotor 12 on the rear plate 15 side.

A plurality of projecting portions 11T which project in the radially inward direction with respect to the axis of rotation X are integrally formed on the outer rotor 11. The inner rotor 12 is formed into a columnar shape having an outer peripheral surface which is brought into close contact with projecting ends of the plurality of projecting portions 11T. Due to such a constitution, a plurality of fluid pressure chambers C are respectively formed on an outer peripheral side of the inner rotor 12 at an intermediate position between the projecting portions 11T arranged adjacent to each other in the rotational direction. A plurality of vanes 17 which constitute partition portions are mounted on an outer periphery of the inner rotor 12 such that the vanes 17 are fitted into the outer periphery of the inner rotor 12 in a projecting manner toward the fluid pressure chambers C. An advanced angle chamber Ca and a retarded angle chamber Cb are formed by partitioning the fluid pressure chamber C by the vane 17. The vane 17 is biases in the direction away from the axis of rotation X by a spring or the like so that the projecting ends are brought into contact with an inner peripheral surface of the fluid pressure chamber C.

As shown in FIG. 1, a torsional spring 18 is provided in an extending manner between the inner rotor 12 and the front plate 14, in which the torsional spring applies a biasing force until the relative rotational phase between the outer rotor 11 and the inner rotor 12 (hereinafter referred to as "relative rotational phase") reaches an intermediate locking phase P1 (one example of a first locking phase) from a most retarded angle phase. A range where the biasing force of the torsional spring 18 acts may go beyond the intermediate locking phase P1 or may not reach the intermediate locking phase P1.

A timing chain 8 extends between and is wound around an output sprocket 7 mounted on the crankshaft 1 of the engine E and a timing sprocket 15S formed on the outer rotor 11. Due to such a constitution, the outer rotor 11 is synchronously rotated with the crankshaft 1. Although not shown in the drawing, a device having the substantially same constitution as the valve open/close timing control device 10 is provided to a front end of the camshaft 3 on an exhaust side and a rotational force is also transmitted to this device from the timing chain 8.

A transmission ratio of the transmission by the timing chain 8 is set such that the camshaft 3 is rotated by ½ turn when the crankshaft 1 is rotated by 1 turn. Accordingly, a rotational speed of the camshaft 3 becomes ½ of a rotational speed of the crankshaft 1.

As shown in FIG. 2, in the valve open/close timing control device 10, the outer rotor 11 is rotated in the drive rotational direction S by a drive force from the crankshaft 1. Further, the rotational direction of the inner rotor 12 with respect to the outer rotor 11 which is equal to the drive rotational direction S is referred to as the advanced angle direction Sa, and the rotational direction of the inner rotor 12 with respect to the outer rotor 11 which is opposite to the drive rotational direction S is referred to as the retarded angle direction Sb. In the valve open/close timing control device 10, the relationship between the crankshaft 1 and the camshaft 3 is set such that an intake compression ratio is increased along with the increase of a displacement amount when the relative rotational phase is displaced in the advanced angle direction Sa, and the intake compression ratio is decreased along with the increase of a displacement amount when the relative rotational phase is displaced in the retarded angle direction Sb.

With respect to the fluid pressure chamber C partitioned by the vane 17, a space where the relative rotational phase is displaced in the advanced angle direction Sa when working fluid is supplied to the fluid pressure chamber C is the advanced angle chamber Ca, and a space where the relative rotational phase is displaced in the retarded angle direction Sb when working fluid is supplied to the fluid pressure chamber C is the retarded angle chamber Cb. The relative rotational phase in a state where the vane 17 reaches an operational end in the advanced angle direction Sa (including a phase where the vane 17 is in the vicinity of the operational end in the advanced angle direction Sa) is referred to as a most advanced angle phase, and the relative rotational phase in a state where the vane 17 reaches an operational end in the retarded angle direction Sb (including a phase where the vane 17 is in the vicinity of the operational end in the retarded angle direction Sb) is referred to as a most retarded angle phase.

[Valve Open/Close Timing Control Device: Locking Mechanism]

The valve open/close timing control device 10 includes two locking mechanisms, that is, an intermediate locking mechanism L1 which constitutes a first locking mechanism and a most retarded angle locking mechanism L2 which constitutes a second locking mechanism. The intermediate locking mechanism L1 locks (restrains) a relative rotational phase between the outer rotor 11 and the inner rotor 12 at an intermediate locking phase P1 (one example of a first locking phase) shown in FIG. 2. The most retarded angle locking mechanism L2 locks (restrains) the relative rotational phase to a most retarded angle locking phase P2 (one example of second locking phase) shown in FIG. 5 which is a phase displaced in the retarded angle direction Sb from the intermediate locking phase P1.

The intermediate locking phase P1 is a relative rotational phase at which an HC discharge quantity can be suppressed at the time of idling after starting the engine E, and is also a relative rotational phase which facilitates the start of the engine E in a state where a temperature of the engine E is lowered to an outside temperature. It is sufficient for the most retarded angle locking mechanism L2 to have a function of locking the relative rotational phase at a phase on a more retarded angle side than the intermediate locking phase P1. The angle at which the most retarded angle locking mechanism L2 locks the relative rotational phase is not limited to the most retarded angle and may be an angle close to the most retarded angle.

As shown in FIG. 2 to FIG. 6, the intermediate locking mechanism L1 is constituted of an intermediate locking member 31 (one example of a first locking member) which is mounted on the projecting portion 11T of the outer rotor 11 in an extendable and retractable manner, an intermediate locking spring 32 (one example of a first biasing mechanism) which biases the intermediate locking member 31 in the projecting direction, and an intermediate fitting recessed portion 33 which is formed on an outer periphery of the inner rotor 12 such that the intermediate locking member 31 is fitted into the intermediate fitting recessed portion 33. The most retarded angle locking mechanism L2 is constituted of a most retarded angle locking member 34 (one example of a second locking member) which is mounted on the projecting portion 11T of the outer rotor 11 in an extendable and retractable manner, a most retarded angle locking spring 35 (one example of a second biasing mechanism) which biases the most retarded angle locking member 34 in the projecting direction, and a most retarded angle fitting recessed portion 36 which is formed on the outer periphery of the inner rotor 12 such that the most retarded angle locking member 34 is fitted into the most retarded angle fitting recessed portion 36.

Figure 5:
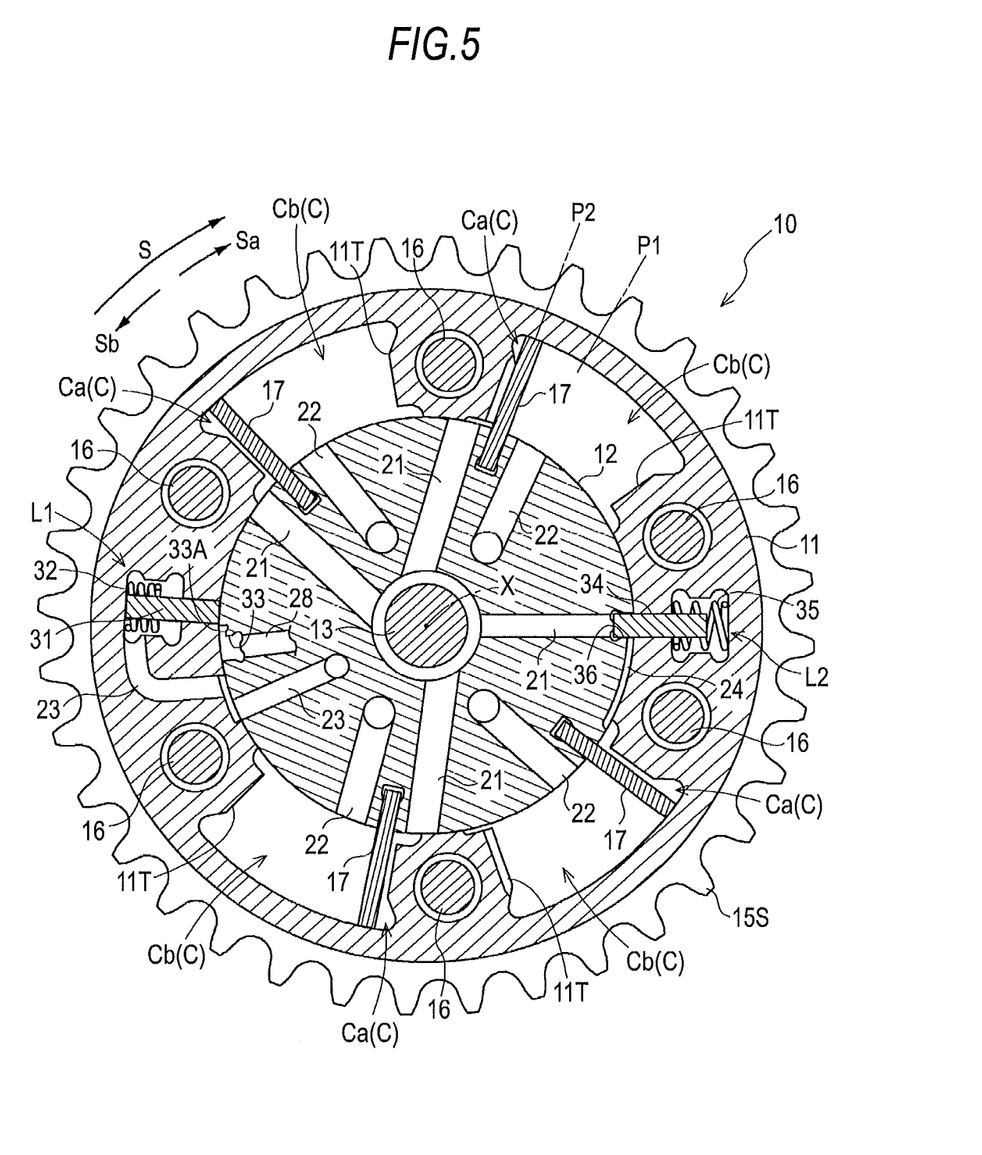
FIG. 5 is a cross-sectional view of the valve open/close timing control device at a most retarded angle locking phase.

Due to such a constitution, at the intermediate locking phase P1, the intermediate locking member 31 is fitted into the intermediate fitting recessed portion 33 by a biasing force of the intermediate locking spring 32 and reaches a locking position. In the same manner, at the most retarded angle locking phase P2, the most retarded angle locking member 34 is fitted into the most retarded angle fitting recessed portion 36 by a biasing force of the most retarded angle locking spring 35 and reaches a locking position.

Figure 3:
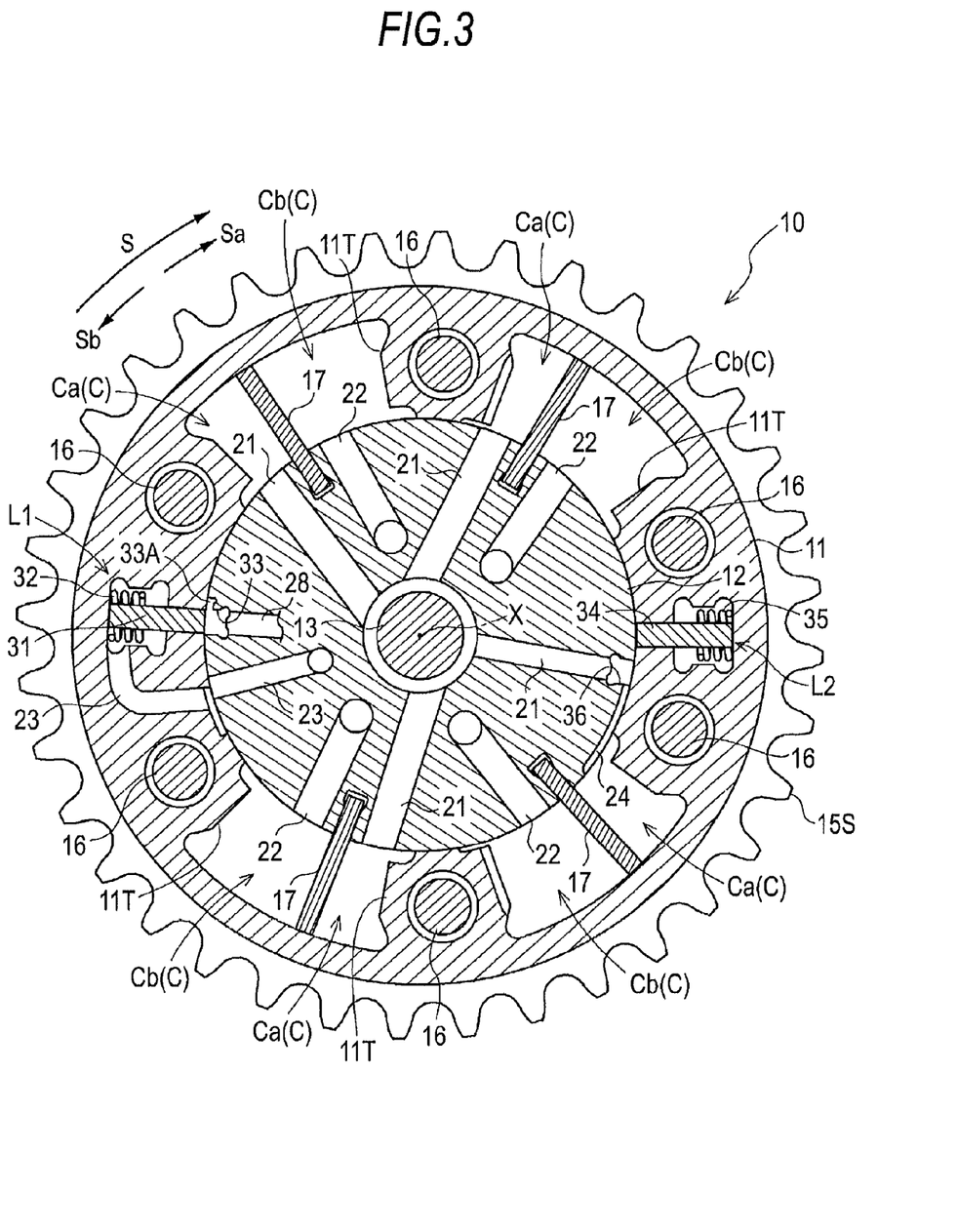
FIG. 3 is a cross-sectional view of the valve open/close timing control device in a state where locking by an intermediate locking mechanism is released.

Particularly, in a state where a relative rotational phase is at the intermediate locking phase P1, when a rotational speed of the crankshaft 1 goes beyond approximately 200 rpm (approximately 100 rpm in terms of camshaft 3), the intermediate locking member 31 is displaced against a biasing force of the intermediate locking spring 32 due to an action of a centrifugal force. A biasing force of the intermediate locking spring 32 is set such that the intermediate locking member 31 is disengaged from the locking position and reaches a locking released position as shown in FIG. 3 due to this displacement. The rotational speed of the camshaft 3 which becomes 100 rpm is the first predetermined speed, and this first predetermined speed is a threshold value at which the intermediate locking member 31 is disengaged from the locking position, and is shifted to the lock released position.

As an opposite case, a biasing force of the most retarded angle locking spring 35 is set such that, in a state where a relative rotational phase is at the most retarded angle locking phase P2, even when a rotational speed of the crankshaft 1 goes beyond approximately 2000 rpm (1000 rpm in terms of camshaft 3), the locking position where the most retarded angle locking member 34 is fitted in the most retarded angle fitting recessed portion 36 is held.

A ratchet-use stepped portion 33A having a groove shape shallower than the intermediate fitting recessed portion 33 is formed on the intermediate fitting recessed portion 33 such that the relative rotational phase is continuously displaced with reference to the intermediate locking phase P1. Due to such a constitution, when the relative rotational phase is displaced in the direction from the most retarded angle locking phase P2 to the intermediate locking phase P1, an end portion of the intermediate locking member 31 is engaged with the stepped portion 33A so that a change in the relative rotational phase can be suppressed and, thereafter, the transition of the relative rotational phase into a state where the intermediate locking member 31 is fitted into the intermediate fitting recessed portion 33 can be performed.

In the same manner as the stepped portion 33A, the position of the stepped portion 33A may be set such that the stepped portion 33A is continuously formed with the intermediate fitting recessed portion 33 in the advanced angle direction Sa, or the stepped portion 33A may be set at two positions such that the stepped portion 33A is continuously formed with the intermediate fitting recessed portion 33 in the advanced angle direction Sa as well as in the retarded angle direction Sb.

The intermediate locking member 31 and the most retarded angle locking member 34 are formed of a plate-like member, and the intermediate fitting recessed portion 33 and the most retarded angle fitting recessed portion 36 are formed on the outer periphery of the inner rotor 12 in a groove shape extending in the axis of rotation X direction corresponding to such a shape of the locking members 31, 34. The intermediate locking member 31 and the most retarded angle locking member 34 may be formed into a pin shape or a block shape, and the intermediate fitting recessed portion 33 and the most retarded angle fitting recessed portion 36 may be formed into a hole shape or the like corresponding to the shape of these locking members.

In the valve open/close timing control device 10, the intermediate locking member 31 and the most retarded angle locking member 34 are provided to the projecting portions 11T which are positioned in an opposed manner with the axis of rotation X sandwiched therebetween out of the plurality of the projecting portions 11T. Due to such a constitution, a rotational balance of the valve open/close timing control device 10 is improved.

[Valve Open/Close Timing Control Device: Fluid Control Mechanism]

As shown in FIG. 2 to FIG. 6, advanced angle control oil passages 21 each of which is communicated with the advanced angle chamber Ca and retarded angle control oil passages 22 each of which is communicated with the retarded angle chamber Cb are formed in the inner rotor 12. In the inner rotor 12, a locking holding oil passage 23 which generates an oil pressure for holding the intermediate locking member 31 of the intermediate locking mechanism L1 at a locking position is formed ranging from the inner rotor 12 to the outer rotor 11. A drain oil passage 28 is connected to a bottom portion of the intermediate fitting recessed portion 33 of the intermediate locking mechanism L1. The drain oil passage 28 allows the supply/discharge of working oil to and from the intermediate fitting recessed portion 33 during an operation of the intermediate locking member 31 thus realizing the smooth operation of the intermediate locking member 31.

An advanced angle control oil passage 21 is connected to a bottom portion of the most retarded angle fitting recessed portion 36 such that the locking (restraining) is released with the supply of working oil into the most retarded angle fitting recessed portion 36 of the most retarded angle locking mechanism L2. The advanced angle control oil passage 21 functions as a locking release oil passage. Further, a supply oil passage 24 which supplies working oil from the advanced angle chamber Ca arranged adjacent to the most retarded angle fitting recessed portion 36 to the most retarded angle fitting recessed portion 36 is formed on the outer periphery of the inner rotor 12.

As shown in FIG. 1, the engine E includes a hydraulic pump 20 which sucks lubrication oil in an oil pan 1A and supplies the lubrication oil as working oil using a drive force of the engine E. The internal combustion engine control system includes an electromagnetically operated phase control valve 26 which selectively supplies working oil from the hydraulic pump 20 to either one of the advanced angle chamber Ca and the retarded angle chamber Cb of the valve open/close timing control device 10, and an electromagnetically operated locking control valve 27 which supplies working oil from the hydraulic pump 20 to the locking holding oil passage 23. The locking holding oil passage 23 and the locking control valve 27 constitute a locking holding mechanism of the present invention. Particularly, the hydraulic pump 20, the phase control valve 26 and an oil passage through which working oil is supplied or discharged constitute a relative rotational phase control mechanism in combination.

The phase control valve 26 is configured to take an advanced angle position, an intermediate position and a neutral position in response to a control signal from the engine control unit 40. As a specific operation mode, when the phase control valve 26 takes the advanced angle position, working oil from the hydraulic pump 20 is supplied to the advanced angle chamber Ca from the advanced angle control oil passage 21, and working oil in the retarded angle chamber Cb is discharged from the retarded angle control oil passage 22 and hence, the relative rotational phase is displaced in the advanced angle direction Sa. Further, when the phase control valve 26 takes the retarded angle position, working oil from the hydraulic pump 20 is supplied to the retarded angle chamber Cb from the retarded angle control oil passage 22, and working oil in the advanced angle chamber Ca is discharged from the advanced angle control oil passage 21 and hence, relative rotational phase is displaced in the retarded angle direction Sb. At the neutral position, working oil is supplied to or discharged from neither the advanced angle chamber Ca nor the retarded angle chamber Cb and hence, the relative rotational phase is maintained.

The locking control valve 27 is configured to take a locking position at which working oil is supplied to the locking holding oil passage 23, an oil discharge position at which oil is discharged from the locking holding oil passage 23, and a suppression position at which the discharge of oil from the locking holding oil passage 23 is suppressed. As a specific operation mode, when the locking control valve 27 takes the locking position, working oil from the hydraulic pump 20 is supplied to the locking holding oil passage 23 so that a holding state is established where the intermediate locking member 31 of the intermediate locking mechanism L1 is held at a locking position by a pressure of working oil. At the oil discharge position, a free state is established where the intermediate locking member 31 can be freely disengaged from the locking position by discharging oil from the locking holding oil passage 23. At the suppression position, the locking state is maintained by preventing the discharge of working oil from the locking holding oil passage 23.

[Summary of Start of Engine]

In a vehicle provided with a hybrid system, the stop and the start of the engine E are frequently performed. Further, when a battery is sufficiently charged in a state where the hybrid system is operated, the engine E is stopped by setting the valve open/close timing control device 10 at a most retarded angle locking phase P2. Accordingly, at the time of starting the engine E, cranking is performed by the traveling motor M1 in a state where the relative rotational phase is locked (restrained) to the most retarded angle locking phase P2 whereby vibrations are suppressed.

When the engine E is started with the valve open/close timing control device 10 set at the most retarded angle locking phase P2, a compression ratio in the combustion chamber is lowered so that startability is lowered. However, when a water temperature of the engine E is a predetermined value or more, the engine E can be started. However, when the engine E is started at the most retarded angle locking phase P2, there is a tendency that electric power of the battery is largely consumed because of the necessity of rotating the crank shaft 1 at a high speed.

When a water temperature of the engine E is low as in the case immediately after starting the hybrid system, to enable favorable start of the engine E, the relative rotational phase is locked (restrained) to the intermediate locking phase P1, and the engine E is started by a drive force of the starter motor M2. Since the engine E is started at the intermediate locking phase P1 in this manner, the relative rotational phase is set at the intermediate locking phase P1 when the hybrid system is stopped. Further, since the high speed rotation is unnecessary when the engine E is started at the intermediate locking phase P1, the use of the starter motor M2 becomes possible. Capacity of the starter motor M2 is small compared to capacity of the traveling motor M1 and hence, power consumption of the battery can be suppressed when the engine E is started at the intermediate locking phase P1.

Further, when the condition is established where the hybrid system is started at a point of time that a long time has not elapsed since the stop of the hybrid system, and the engine E is started in a state where a water temperature of the engine E is at a predetermined value or more, it is desirable to start the engine E in a state where vibrations are suppressed. Due to such a reason, the intermediate locking mechanism L1 is constituted such that, at the time of starting the engine E, locking of the intermediate locking phase P1 is released, and the ignition is performed after the relative rotational phase is shifted to the most retarded angle locking phase P2 so as to start the engine E. The start condition for starting the engine E means a case where a discharge amount of the battery exceeding a predetermined value is detected or a case where a traveling torque is insufficient and reaches a state where an assist is necessary.

[Control Constitution and Control Mode]

As shown in FIG. 1, signals from the shaft sensor 1S, the start switch 45, the water temperature sensor 46, the battery sensor 47, and the phase detection sensor 48 are inputted to the engine control unit 40. Further, the engine control unit 40 outputs signals for controlling the traveling motor M1, the starter motor M2, the fuel control device 5 and the ignition control device 6 respectively, and also outputs control signals to the phase control valve 26 and the lock control valve 27.

The start switch 45 starts the hybrid system with an ON operation thereof and stops the hybrid system with an OFF operation thereof. As described previously, the traveling motor M1 also has a function as a generator so that when a discharge amount of the battery exceeds a predetermined value, the hybrid system starts the engine E so as to charge the battery. Further, a basic control mode is adopted where also when a torque of traveling motor M1 becomes insufficient, an assist of the traveling motor M1 is performed such that the engine E is started and a drive force of the engine E is transmitted to the traveling system.

Particularly, when the engine control unit 40 stops the engine E in a state where the hybrid system is operated (start switch 45 being in an ON state), a control of setting the relative rotational phase to the most retarded angle locking phase P2 is performed. Further, when the start switch 45 is turned off, the relative rotational phase is set to the intermediate locking phase P1.

To explain a specific control mode, when the engine E is operated at a point of time that the start switch 45 is turned off, the phase control part 42 of the engine control unit 40 makes use of working oil in the hydraulic pump 20. Then, in a state where an oil pressure from the locking holding oil passage 23 is applied to the intermediate locking member 31 based on a control by the locking control valve 27, the phase control valve 26 is controlled so as to displace the relative rotational phase in the direction of the intermediate locking phase P1, the intermediate locking member 31 is fitted into the intermediate fitting recessed portion 33 at a point of time that the relative rotational phase reaches the intermediate locking phase P1 and, thereafter, the engine E is stopped.

When the engine E is stopped at a point of time that the start switch 45 is turned off, the hydraulic pump 20 is made to temporarily function by temporarily starting the engine E or by making use of a drive force from the traveling motor M1 thus performing a control substantially equal to the previously-mentioned control whereby the relative rotational phase is displaced to the intermediate locking phase P1 and the intermediate locking member 31 is fitted into the intermediate fitting recessed portion 33.

[Control at the Time of Starting Engine]

When a water temperature of the engine E is below a predetermined value, the start mode setting part 43 starts the engine E by the starter motor M2 by holding the relative rotational phase at the intermediate locking phase P1. On the other hand, when the water temperature of the engine E is the predetermined value or more, the start mode setting part 43 starts the engine E by the traveling motor M1 by holding the relative rotational phase at the most retarded angle locking phase P2. The basic control mode of the start mode setting part 43 is set in this manner, and the summary of the control mode by the start mode setting part 43 is described in a flowchart shown in FIG. 7.

Figure 7:
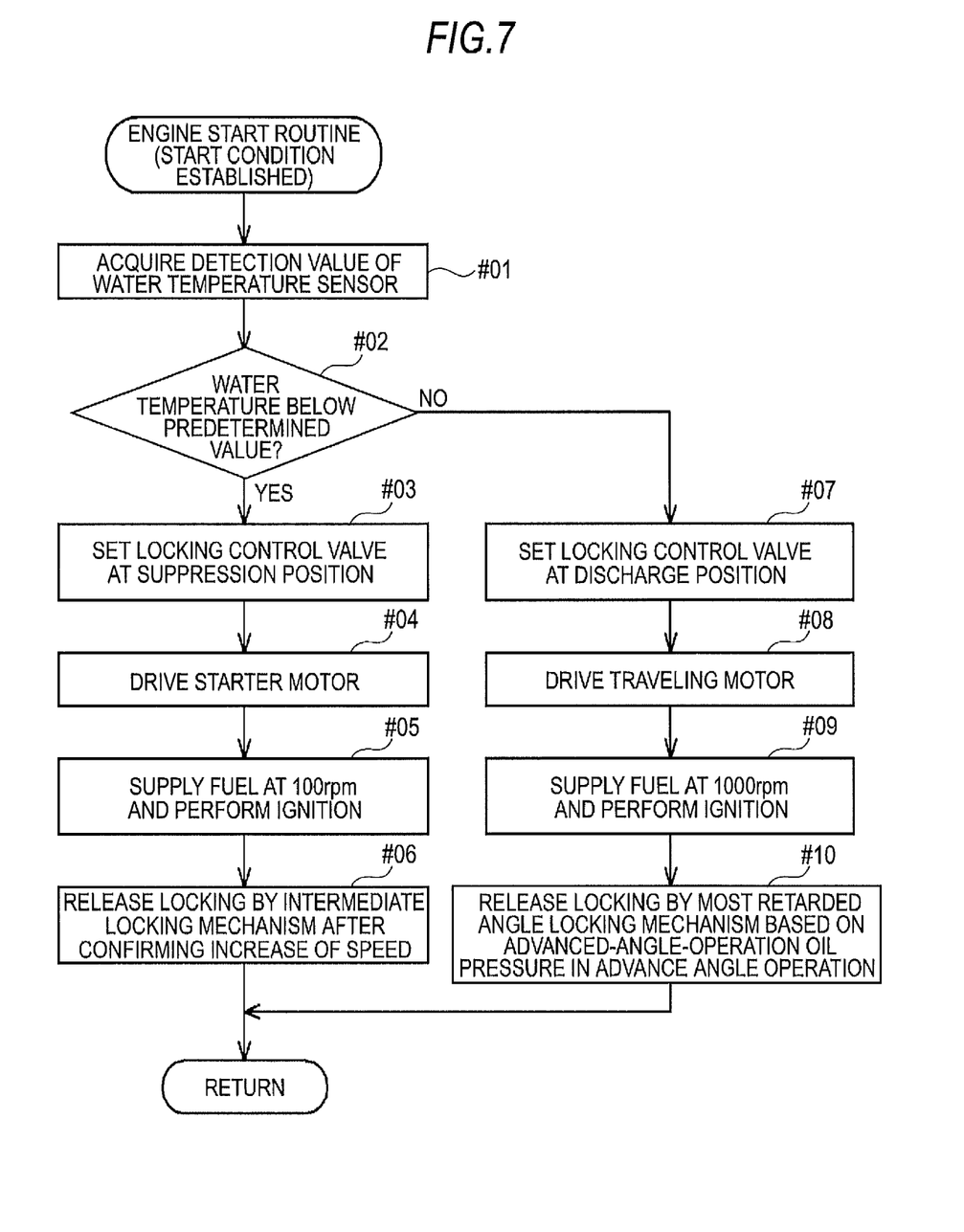
FIG. 7 is a flowchart showing an engine starting routine.

When the start condition of the engine E is established, a water temperature is acquired by the water temperature sensor 46, and when the acquired water temperature is below a predetermined value, the locking control valve 27 is set at the suppression position and the starter motor M2 is driven (#01 to #04 step), That is, a state where a water temperature is below the predetermined value means that the start of the engine E is the first start after the hybrid system is started, and the valve open/close timing control device 10 is at the intermediate locking phase P1 as shown in FIG. 2. Further, working oil cannot be supplied by the hydraulic pump 20 at the time of starting the engine E and hence, it is impossible to hold a locking state by making use of oil pressure of working oil. Accordingly, the locking control valve 27 is set at the suppression position so as to prevent oil in the locking holding oil passage 23 from being discharged. Accordingly, even in a state where the valve open/close timing control device 10 is rotated about the axis of rotation X so that a centrifugal force is applied to the intermediate locking member 31, the intermediate locking member 31 is held at the locking position so that the relative rotational phase is held at the intermediate locking phase P1

At a point of time that a rotational speed of the crankshaft 1 is increased due to the continuation of driving of the starter motor M2, and the rotational speed detected by the shaft sensor 1S reaches 100 rpm, the fuel control device 5 starts the supply of fuel to the combustion chamber, and the ignition control device 6 supplies electric power to the ignition plug thus performing the ignition (#05 step). Due to such an operation, the engine E is started and the rotational speed of the crankshaft 1 is further increased.

In this embodiment, 100 rpm is a specific numerical value of the rotational speed necessary for ignition at the time of starting the engine E at the intermediate locking phase P1. The rotational speed of 100 rpm is set lower than a rotational speed which is a threshold value at which the intermediate locking member 31 is disengaged from the locking position by a centrifugal force and is shifted to the locking release position (200 rpm in terms of rotational speed of valve open/close timing control device 10).

Next, after confirming that a rotational speed of the crankshaft 1 detected by the shaft sensor 1S is increased to a predetermined value exceeding 100 rpm, the locking control valve 27 is set at the oil discharge position so that working oil in the locking holding oil passage 23 is discharged whereby the disengagement of the intermediate locking member 31 to the locking release position is allowed by a centrifugal force thus releasing locking (#06 step).

As the timing at which the intermediate locking member 31 is disengaged from the locking position to the locking released position, the timing is set where the rotational speed of the engine E is higher than the maximum rotational speed of the starter motor M2 and is lower than the maximum rotational speed of the traveling motor M1.

On the other hand, when the start condition of the engine E is established and a water temperature acquired by the water temperature sensor 46 is equal to or above a predetermined temperature, the locking control valve 27 is set at the oil discharge position and the traveling motor M1 is driven (#-02, #07 and #08 step).

That is, when the engine E is stopped after the engine E is started in a state where the hybrid system is operated, a water temperature is equal to or above the predetermined temperature and the valve open/close timing control device 10 is at the most retarded angle locking phase P2 as shown in FIG. 5. Accordingly, a control of starting the engine E by a drive force of the traveling motor M1 is performed in a state where the relative rotational phase is held at the most retarded angle locking phase P2 by the most retarded angle locking mechanism L2.

However, when the hybrid system is started again at a point of time that a long time has not elapsed from the stop of the hybrid system, at timing that the start condition of the engine E is established, the water temperature is equal to or above the predetermined temperature and the valve open/close timing control device 10 is at the intermediate locking phase P1 as shown in FIG. 2.

Also in such a state, by driving the traveling motor M1 by setting the locking control valve 27 at the oil discharge position, as shown in FIG. 3, the intermediate locking member 31 is disengaged from the locking position against a biasing force of the intermediate locking spring 32 by a centrifugal force thus realizing an operation of shifting the intermediate locking member 31 to the locking release position.

Figure 4:
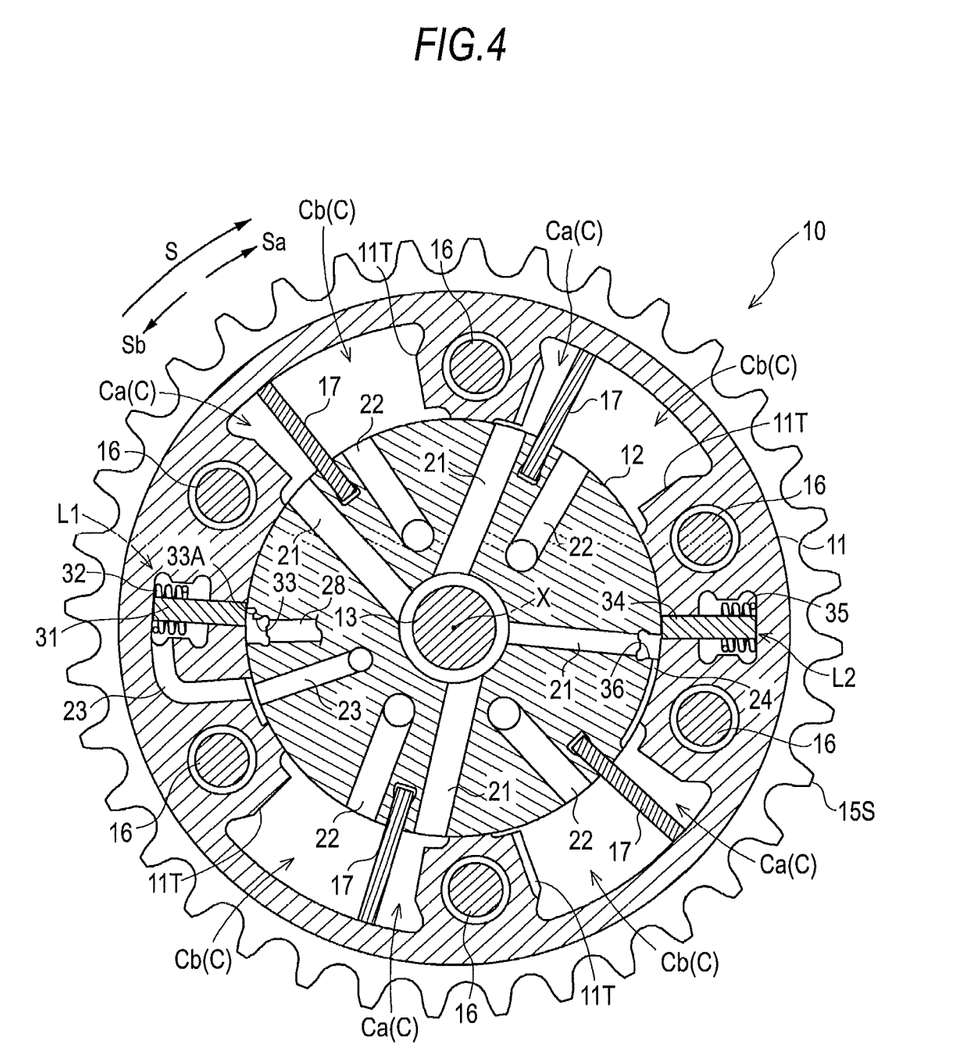
FIG. 4 is a cross-sectional view of the valve open/close timing control device in a state where a relative rotational phase is shifted from an intermediate locking phase to a most retarded angle locking phase.

After the locking is released, by making use of a phenomenon that the relative rotational phase is displaced in the retarded angle direction by a reaction force from the camshaft 3, the relative rotational phase is displaced in the retarded angle direction as shown in FIG. 4. At timing that the relative rotational phase reaches the most retarded angle locking phase P2, the most retarded angle locking member 34 is fitted into the most retarded angle fitting recessed portion 36 by a biasing force of the most retarded angle locking spring 35 so that the most retarded angle locking member 34 is shifted to a locking state by the most retarded angle locking mechanism L2.

Then, in a state where the relative rotational phase is held at the most retarded angle locking phase P2, and at a point of time that a rotational speed of the crankshaft 1 is increased so that the rotational speed of the crankshaft 1 detected by the shaft sensor 1S reaches 1000 rpm, the fuel control device 5 supplies fuel to the combustion chamber and the ignition control device 6 supplies electric power to the ignition plug thus performing the ignition (#09 step).

Next, when an operation condition where an advanced angle operation is necessary is established, an operation of supplying working oil to the advanced angle chamber Ca is performed by controlling the phase control valve 26. Due to such an operation, the most retarded angle locking member 34 is displaced to the lock release position by oil pressure of working oil from the advanced angle control oil passage 21 which is connected to the bottom portion of the most retarded angle fitting recessed portion 36 so that locking by the most retarded angle locking mechanism L2 is released whereby the relative rotational phase is displaced in the advanced angle direction Sa (#10 step).

That is, in starting the engine E in a state where a water temperature is equal to or above the predetermined temperature, when the relative rotational phase is at the most retarded angle locking phase P2, the engine E is started in a state where this locking state is held. On the other hand, when the relative rotational phase is at the intermediate locking phase P1 in a state where the water temperature is equal to or above the predetermined temperature, locking by the intermediate locking mechanism L1 is released so that the relative rotational phase is displaced to the most retarded angle locking phase P2 and the engine E is started.

Figure 6:
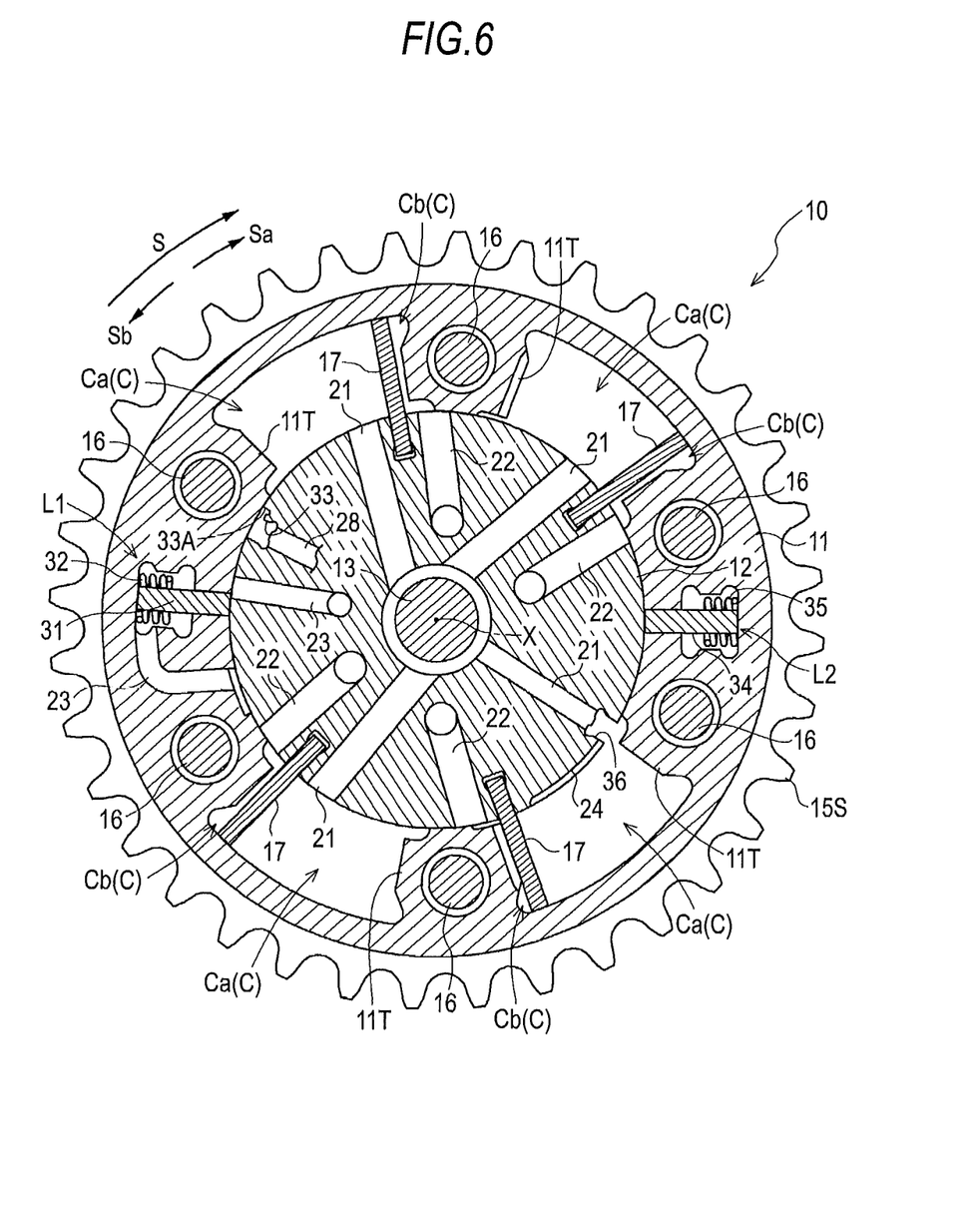
FIG. 6 is a cross-sectional view of the valve open/close timing control device in a state where a relative rotational phase is displaced from an intermediate locking phase in the advanced angle direction.

After the engine E is started in this manner, working oil is supplied to the advanced angle chamber Ca or the retarded angle chamber Cb by controlling the phase control valve 26 so that the relative rotational phase can be desirably set as shown in FIG. 6 whereby the engine E can be efficiently operated.

[Manner of Operation and Advantageous Effects of Embodiment]

Due to such a constitution, when the water temperature of the engine E is below the predetermined value, the engine E is started with a drive force of the starter motor M2 in a state where the relative rotational phase is held at the intermediate locking phase P1 by the intermediate locking mechanism L1 so that the engine E can be started without wastefully consuming electric power.

On the other hand, when the water temperature of the engine E is equal to or above the predetermined value and the relative rotational phase is held at the most retarded angle locking phase P2, the engine E can be started in a state where vibrations are suppressed by using a drive force of the traveling motor M1.

Particularly, even in a case where the water temperature of the engine E is equal to or above the predetermined value, when the relative rotational phase is at the intermediate locking phase P1, by driving the traveling motor M1 while setting the locking control valve 27 at the oil discharge position, working oil is discharged from the locking holding oil passage 23 so that the intermediate locking member 31 is disengaged from the locking position against a biasing force of the intermediate locking spring 32 by a centrifugal force. Next, by making use of a phenomenon that the relative rotational phase is displaced in the retarded angle direction by a reaction force from the camshaft 3, the relative rotational phase is displaced in the retarded angle direction. At timing that the relative rotational phase reaches the most retarded angle locking phase P2, the most retarded angle locking member 34 is fitted into the most retarded angle fitting recessed portion 36 by a biasing force of the most retarded angle locking spring 35 so that the most retarded angle locking member 34 is shifted to a locking state by the most retarded angle locking mechanism L2. Accordingly, the engine E can be started at the most retarded angle locking phase P2.

That is, when the water temperature of the engine E is equal to or above the predetermined value, by driving the starter motor M2 while setting the locking control valve 27 at the suppression position, the engine E can be started at the intermediate locking phase P1. On the other hand, when the water temperature of the engine E is below the predetermined value, by driving the traveling motor M1 while setting the locking control valve 27 at the oil discharge position, the engine E can be started at the most retarded angle locking phase P2 whatever locking state of the valve open/close timing control device 10 takes at the time of opening or closing the valve.

[Another Embodiment]

The present invention may have the following constitutions besides the above-mentioned constitution.

(a) The locking holding mechanism may be configured such that an accumulator may be provided for supplying working oil even when the engine E is stopped, or a hydraulic pump driven by an electrically-operated motor is provided and working oil from these parts is applied in the direction that the displacement of the intermediate locking member 31 from the locking position is suppressed.

(b) The locking holding mechanism may be provided with an electromagnetically operated operating member which can switch the position of the intermediate locking member 31 between a holding position where the displacement on the intermediate locking member 31 in the direction that the intermediate locking member 31 is disengaged from the locking position is suppressed and the free movement position where the displacement of the intermediate locking member 31 in the direction that the intermediate locking member 31 is disengaged from the locking position is allowed.

(c) An oil temperature sensor which detects an oil temperature of working oil is provided for detecting a temperature of the engine E (internal combustion engine), and the start mode setting part 43 sets a control mode such that a start mode of the engine E is set based on a detection result of the oil temperature sensor. Further, in the present invention, the start mode setting part 43 may set a start mode of the engine E based on a detection result of the water temperature sensor 46 and a detection result of the oil temperature sensor.

(c) As has been explained in conjunction with the embodiment, the constitution of the present invention is applicable to a vehicle which performs an idling stop.

(d) The first locking phase is not limited to the intermediate locking phase P1 shown in the drawing and may be set to a desired phase. The second locking phase is also not limited to the most retarded angle locking phase P2 shown in the drawing and may be set to a desired phase which is on a more retarded angle side than the first locking phase.

The present invention is applicable to a system having a valve open/close timing control device which can lock a relative rotational phase at an intermediate locking phase and a most retarded angle locking phase.

Therefore, aspects of this disclosure are further described below. According to an aspect of this disclosure, there is provided a valve open/close timing control system where a valve open/close timing control device includes: a drive-side rotating member which is rotated synchronously with a crankshaft of an internal combustion engine; a driven-side rotating member which is arranged coaxially with a camshaft for opening or closing a valve and is integrally rotated with the camshaft; a relative rotational phase control mechanism which displaces a relative rotational phase between the drive-side rotating member and the driven-side rotating member in an advanced angle direction or in a retarded angle direction by selectively supplying working oil to one of an advanced angle chamber and a retarded angle chamber formed between the drive-side rotating member and the driven-side rotating member; and a first locking member which is biased to a locking position by a first biasing mechanism for restraining the relative rotational phase at a predetermine first locking phase, and a second locking member which is biased to a locking position by a second biasing mechanism for restraining the relative rotational phase at a second locking phase which is displaced in the retarded angle direction from the first locking phase, in which the internal combustion engine is configured to be started by a drive force generated by a traveling motor used for traveling or by a drive force generated by a starter motor used at the time of starting the internal combustion engine, and the valve open/close timing control system also includes a control unit which is configured, for starting the internal combustion engine while changing the relative rotational phase at the time of starting the internal combustion engine, to drive the starter motor or the traveling motor at the time of starting the internal combustion engine at the first locking phase, and to drive the traveling motor at the time of starting the internal combustion engine at the second locking phase.

Due to such a constitution, when the internal combustion engine is started by the starter motor, the relative rotational phase of the valve open/close timing control device is at the first locking phase where a compression ratio is higher than a compression ratio at the second lock phase. Accordingly, starting of the internal combustion engine which performs ignition at a relatively low rotational speed becomes possible. Particularly, to compare with the system where an internal combustion engine is started by a drive force of the traveling motor in both phases, that is, in the first locking phase as well as in the second locking phase, since the starter motor having low capacity compared to the traveling motor is used, the reduction of electric power consumed at the time of starting the internal combustion engine can be realized.

Further, when the internal combustion engine is started by the traveling motor at the second locking phase, the vibrations of the internal combustion engine can be suppressed. Further, in the valve open/close timing control device where the relative rotational phase can be displaced from the first locking phase to the second locking phase, for example, by displacing the relative rotational phase to the second locking phase by starting cranking by the traveling motor even at the first locking phase, starting with suppressed vibrations can be also realized.

Accordingly, it is possible to provide the valve open/close timing control system which does not wastefully consume electric power at the time of starting the internal combustion engine.

According to the present invention, a biasing force of the first biasing mechanism may be set such that the first locking member is displaced to a lock released position by a centrifugal force when a rotational speed of the valve open/close timing control device exceeds a first predetermined speed, the valve open/close timing control device may include a locking holding mechanism capable of switching a state of the first locking member between a holding state where the first locking member is held in the locking position and a free position where the first locking member is not held in the locking position, and the control unit, when the internal combustion engine is started by driving the traveling motor at the first locking phase, may set the locking holding mechanism to the free state thus allowing the displacement of the relative rotational phase in a retarded angle direction, and may perform ignition in a state where the relative rotational phase reaches the second locking phase and the second locking member is restrained.

Due to such a constitution, when cranking is performed by driving the traveling motor while setting the locking holding mechanism in a holding state, the first locking member reaches the locking released position by a centrifugal force, and the relative rotational phase is displaced in the retarded angle direction by a reaction force of the camshaft or the like. When the relative rotational phase is displaced to the second locking phase due to such displacement, the second locking member reaches the locking position by a biasing force of the second biasing mechanism. Accordingly, the relative rotational phase is restrained to the second locking phase so that ignition is performed while continuing cranking in a state where vibrations are suppressed thus realizing starting of the internal combustion engine eventually.

According to the present invention, a biasing force of the first biasing mechanism may be set such that the first locking member is displaced to a lock released position by a centrifugal force when a rotational speed of the valve open/close timing control device exceeds a first predetermined speed, the valve open/close timing control device may include a locking holding mechanism capable of setting a state of the first locking member between a holding state where the first locking member is held at the locking position and a free position where the first locking member is not held at the locking position, and the control unit, when the internal combustion engine is started by driving the starter motor at the first locking phase, may set the locking holding mechanism to the holding state until the rotational speed of the valve open/close timing control device reaches a rotational speed lower than the first predetermined speed and necessary for ignition.

Due to such a constitution, when the internal combustion engine is started by driving the starter motor in a state where the relative rotational phase is restrained in the first locking phase by the locking holding mechanism, cranking of the internal combustion engine is performed with a compression ratio suitable for starting. When the internal combustion engine is started by ignition so that the rotational speed exceeds the first predetermined speed, the first locking member of the first locking mechanism is displaced to the locking released position by a centrifugal force, and the relative rotational phase can be set desirably.

According to the present invention, timing at which the first locking member is disengaged from the locking position may be set to a rotational speed higher than a rotational speed by the starter motor and lower than a rotational speed at which ignition is performed at the time of starting by the traveling motor.

Due to such a constitution, the first locking member is disengaged from the locking position after the rotational speed of the internal combustion engine is increased by ignition and hence, the relative rotational phase can be set desirably after disengaging the first locking member. Further, ignition is already performed in a state where a rotational speed is lower than a rotational speed at which ignition is performed by the traveling motor and hence, consumption of electric power of a battery can be reduced.

According to the present invention, the locking holding mechanism may be constituted of a locking holding oil passage which applies oil pressure for holding the first locking member at the locking position therethrough, and a locking control valve for supplying and discharging working oil in the locking holding oil passage, the holding state may be established by setting the locking control valve at a suppression position where the working oil is not discharged from the locking holding oil passage, and the free state may be established by setting the locking control valve at an oil discharge position where the working oil is discharged from the locking holding oil passage.

Due to such a constitution, when the relative rotational phase is maintained at the first locking phase, by setting the locking control valve at the suppressing position, working oil is not discharged from the locking holding oil passage so that the first locking member is held at the locking position. As an opposite case, when the relative rotational phase is displaced from the first locking phase, by setting the locking control valve at the oil discharge position, working oil is discharged from the locking holding oil passage whereby the first locking member can be disengaged from the locking position due to an action of a centrifugal force.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly it is expressly intended that all such variations, changes and equivalents which fall within the spirit and scope of the present invention as defined in the claims, be embraced thereby.

FIG. 1
5: fuel control device
6: ignition control device
40: engine control unit
41: engine control part
42: phase control part
43: start mode setting part
45: start switch
46: water temperature sensor
47: battery sensor
48: phase detection sensor FIG. 7
エンジン始動ルーチン ( 始動条件が成立 ): engine start routine (start condition established)
1: acquire detection value of water temperature sensor
2: water temperature below predetermined value?
3: set locking control valve at suppression position
4: drive starter motor
5: supply fuel at 100 rpm and perform ignition
6: release locking by intermediate locking mechanism after confirming increase of speed
7: set locking control valve at discharge position
8: drive traveling motor
9: supply fuel at 1000 rpm and perform ignition
10: release locking by most retarded angle locking mechanism based on advanced-angle-operation oil pressure in advance angle operation
リターン : return

What is claimed is:

1. A valve open/close timing control system where a valve open/close timing control device comprises:
a drive-side rotating member which is rotated synchronously with a crankshaft of an internal combustion engine;
a driven-side rotating member which is arranged coaxially with a camshaft for opening or closing a valve and is integrally rotated with the camshaft;
a relative rotational phase control mechanism which displaces a relative rotational phase between the drive-side rotating member and the driven-side rotating member in an advanced angle direction or in a retarded angle direction by selectively supplying working oil to one of an advanced angle chamber and a retarded angle chamber formed between the drive-side rotating member and the driven-side rotating member; and
a first locking member which is biased to a locking position by a first biasing mechanism for restraining the relative rotational phase at a predetermine first locking phase, and a second locking member which is biased to a locking position by a second biasing mechanism for restraining the relative rotational phase at a second locking phase which is displaced in the retarded angle direction from the first locking phase, wherein
the internal combustion engine is configured to be started by a drive force generated by a traveling motor used for traveling or by a drive force generated by a starter motor used at the time of starting the internal combustion engine, and
the valve open/close timing control system also comprises a control unit which is configured, for starting the internal combustion engine while changing the relative rotational phase at the time of starting the internal combustion engine, to drive the starter motor or the traveling motor at the time of starting the internal combustion engine at the first locking phase, and to drive the traveling motor at the time of starting the internal combustion engine at the second locking phase.

2. The valve open/close timing control system according to claim 1, wherein a biasing force of the first biasing mechanism is set such that the first locking member is displaced to a lock released position by a centrifugal force when a rotational speed of the valve open/close timing control device exceeds a first predetermined speed,
the valve open/close timing control device includes a locking holding mechanism capable of switching a state of the first locking member between a holding state where the first locking member is held in the locking position and a free position where the first locking member is not held in the locking position, and
the control unit, when the internal combustion engine is started by driving the traveling motor at the first locking phase, sets the locking holding mechanism to the free state thus allowing the displacement of the relative rotational phase in a retarded angle direction, and performs ignition in a state where the relative rotational phase reaches the second locking phase and the second locking member is restrained.

3. The valve open/close timing control system according to claim 2, wherein the locking holding mechanism is constituted of a locking holding oil passage which applies oil pressure for holding the first locking member at the locking position therethrough, and a locking control valve for supplying and discharging working oil in the locking holding oil passage, the holding state is established by setting the locking control valve at a suppression position where the working oil is not discharged from the locking holding oil passage, and the free state is established by setting the locking control valve at an oil discharge position where the working oil is discharged from the locking holding oil passage.

4. The valve open/close timing control system according to claimed 1, wherein a biasing force of the first biasing mechanism is set such that the first locking member is displaced to a lock released position by a centrifugal force when a rotational speed of the valve open/close timing control device exceeds a first predetermined speed,
the valve open/close timing control device includes a locking holding mechanism setting a state of the locking member between a holding state where the first locking member is held at the locking position and a free position where the first locking member is not at the locking position, and
the control unit, when the internal combustion engine is started by driving the starter motor at the first locking phase, sets the locking holding mechanism to the holding state until the rotational speed of the valve open/close timing control device reaches a rotational speed lower than the first predetermined speed and necessary for ignition.

5. The valve open/close timing control system according to claim 4, wherein timing at which the first locking member is disengaged from the locking position is set to a rotational speed higher than a rotational speed by the starter motor and lower than a rotational speed at which ignition is performed at the time of starting by the traveling motor.

6. The valve open/close timing control system according to claim 4, wherein the locking holding mechanism is constituted of a locking holding oil passage which applies oil pressure for holding the first locking member at the locking position therethrough, and a locking control valve for supplying and discharging working oil in the locking holding oil passage, the holding state is established by setting the locking control valve at a suppression position where the working oil is not discharged from the locking holding oil passage, and the free state is established by setting the locking control valve at an oil discharge position where the working oil is discharged from the locking holding oil passage.

\* \* \* \* \*